US011972749B2

(12) United States Patent
Wargnier et al.

(10) Patent No.: US 11,972,749 B2
(45) Date of Patent: Apr. 30, 2024

(54) WEARABLE SOUND DEVICE

(71) Applicant: xMEMS Labs, Inc., Santa Clara, CA (US)

(72) Inventors: James Wargnier, Tracy, CA (US); Michael David Housholder, San Jose, CA (US); Yanchen Lu, Campbell, CA (US); JengYaw Jiang, Saratoga, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/303,599

(22) Filed: Apr. 20, 2023

(65) Prior Publication Data

US 2023/0260494 A1 Aug. 17, 2023

Related U.S. Application Data

(63) Continuation-in-part of application No. 17/842,810, filed on Jun. 17, 2022, now Pat. No. 11,884,535,
(Continued)

(51) Int. Cl.
*G10K 11/00* (2006.01)

(52) U.S. Cl.
CPC .................................. *G10K 11/002* (2013.01)

(58) Field of Classification Search
CPC .. H04R 1/1075; H04R 1/1016; H04R 1/1066; H04R 2460/11; H04R 17/00; H04R 7/06;
(Continued)

(56) References Cited

U.S. PATENT DOCUMENTS 5,970,998 A 10/1999 Talbot
8,532,320 B2 9/2013 Nordahn
(Continued)

FOREIGN PATENT DOCUMENTS

CN 101785327 A 7/2010
CN 104540776 A 4/2015
(Continued)

OTHER PUBLICATIONS

Liang, the specification, including the claims, and drawings in the U.S. Appl. No. 17/344,983, filed Jun. 11, 2021.
(Continued)

*Primary Examiner* — Carolyn R Edwards
*Assistant Examiner* — Julie X Dang
(74) *Attorney, Agent, or Firm* — Winston Hsu

(57) ABSTRACT

A wearable sound device includes a venting device including a film structure and an actuator and a driving circuit configured to be controlled by a controller and to drive the actuator, such that the film structure is controlled to form a vent or to seal the vent. The controller is coupled to a sensing device configured to generate a sensing result and determine whether to seal the vent according to the sensing result. The film structure partitions a space within the wearable sound device into a first volume and a second volume. The first volume is connected to or to be connected to an ear canal of a wearable sound device user. The second volume is connected to or to be connected to an ambient of the wearable sound device. The first volume and the second volume are connected via the vent when the vent is formed.

21 Claims, 9 Drawing Sheets

Related U.S. Application Data which is a continuation-in-part of application No. 17/344,980, filed on Jun. 11, 2021, now Pat. No. 11,399,228.

(60) Provisional application No. 63/050,763, filed on Jul. 11, 2020, provisional application No. 63/051,885, filed on Jul. 14, 2020, provisional application No. 63/171,919, filed on Apr. 7, 2021, provisional application No. 63/320,703, filed on Mar. 17, 2022, provisional application No. 63/342,161, filed on May 16, 2022, provisional application No. 63/446,798, filed on Feb. 17, 2023.

(58) Field of Classification Search
CPC ...... H04R 19/005; H04R 7/10; H04R 31/003; H04R 7/26; H04R 2440/01; H04R 19/02; H04R 2201/003; H04R 2499/11; H04R 19/04
See application file for complete search history.

(56) References Cited

U.S. PATENT DOCUMENTS

| | | | | |
|---|---|---|---|---|
| 8,724,200 | B1 | 5/2014 | Wu | |
| 10,067,734 | B2 | 9/2018 | Watson | |
| 10,367,540 | B1 * | 7/2019 | Medapalli | G10L 15/30 |
| 11,323,797 | B2 | 5/2022 | Liang | |
| 11,399,228 | B2 | 7/2022 | Liang | |
| 2003/0029705 | A1 | 2/2003 | Qiu | |
| 2006/0131163 | A1 | 6/2006 | Mei | |
| 2007/0007858 | A1 | 1/2007 | Sorensen | |
| 2008/0267416 | A1 | 10/2008 | Goldstein | |
| 2011/0051985 | A1 | 3/2011 | Hwang | |
| 2011/0103616 | A1 | 5/2011 | Kwon | |
| 2011/0181150 | A1 | 7/2011 | Mahameed | |
| 2012/0053393 | A1 | 3/2012 | Kaltenbacher | |
| 2013/0121509 | A1 | 5/2013 | Hsu | |
| 2013/0223023 | A1 | 8/2013 | Dehe | |
| 2014/0140558 | A1 * | 5/2014 | Kwong | H04R 3/007 381/345 |
| 2015/0163599 | A1 | 6/2015 | Shim | |
| 2015/0204940 | A1 | 7/2015 | Teeter | |
| 2015/0237438 | A1 | 8/2015 | Lee | |
| 2016/0176704 | A1 | 6/2016 | Cargill | |
| 2016/0381464 | A1 * | 12/2016 | Elyada | G10K 15/04 381/97 |
| 2017/0021391 | A1 | 1/2017 | Guedes | |
| 2017/0040012 | A1 | 2/2017 | Goldstein | |
| 2017/0041708 | A1 | 2/2017 | Barzen | |
| 2017/0164115 | A1 | 6/2017 | van Halteren | |
| 2017/0201192 | A1 | 7/2017 | Tumpold | |
| 2017/0217761 | A1 | 8/2017 | Chung | |
| 2017/0260044 | A1 | 9/2017 | Cargill | |
| 2017/0325030 | A1 | 11/2017 | Stoppel | |
| 2018/0020194 | A1 * | 1/2018 | Kim | H04N 7/188 |
| 2018/0120938 | A1 | 5/2018 | Frescas | |
| 2019/0039880 | A1 | 2/2019 | Paci | |
| 2019/0098390 | A1 | 3/2019 | Carino | |
| 2019/0181776 | A1 | 6/2019 | Tumpold | |
| 2019/0208343 | A1 | 7/2019 | Monti | |
| 2019/0215620 | A1 * | 7/2019 | Albahri | H04R 25/554 |
| 2019/0349665 | A1 * | 11/2019 | Grinker | H04R 11/02 |
| 2020/0100033 | A1 * | 3/2020 | Stoppel | H04R 31/003 |
| 2020/0178000 | A1 | 6/2020 | Niekiel | |
| 2020/0178003 | A1 | 6/2020 | Zurbruegg | |
| 2020/0193973 | A1 * | 6/2020 | Tolomei | G10L 15/08 |
| 2020/0211521 | A1 * | 7/2020 | Voss | H04R 7/04 |
| 2020/0213770 | A1 * | 7/2020 | Duan | H04R 17/02 |
| 2020/0244275 | A1 | 7/2020 | Marzin | |
| 2020/0352788 | A1 | 11/2020 | Van 'T Hof | |

FOREIGN PATENT DOCUMENTS

| | | | |
|---|---|---|---|
| CN | 105009604 | A | 10/2015 |
| CN | 106937193 | A | 7/2017 |
| CN | 107223346 | A | 9/2017 |
| CN | 108702575 | A | 10/2018 |
| CN | 110022506 | A | 7/2019 |
| CN | 209402687 | U | 9/2019 |
| CN | 111063790 | A | 4/2020 |
| JP | 11-307441 | A | 11/1999 |
| JP | 2009-512375 | A | 3/2009 |
| JP | 2020-31444 | A | 2/2020 |
| KR | 10-2010-0002351 | A | 1/2010 |
| KR | 10-2015-0030691 | A | 3/2015 |
| KR | 10-2017-0139320 | A | 12/2017 |
| WO | 2019/177324 | A1 | 9/2019 |

OTHER PUBLICATIONS

Hyonse Kim et al, A slim type microvalve driven by PZT films, Sensors and Actuators A: Physical, Jan. 18, 2005, pp. 162-171, vol. 121, Elsevier B. V., XP027806904.

Wang Zhicheng, Stylish structure and innovative features of new generation speakers, Household Electric Appliances, Issue 12, 2003, p. 38-40, China Academic Journal Electronic Publishing House ,2003.

Zhou Xiao-wei et al., Preliminary evaluation of predicative performance of BAHA softband in the conductive or mixed hearing loss patients, Journal of Otolaryngology and Ophthalmology of Shandong University, vol. 29, Issue No. 2, 2015, p. 28-30, China Academic Journal Electronic Publishing House. ,Apr. 16, 2015.

Stefan Liebich et al., active occlusion cancellation with hear-through equalization for headphones, Institute of Communication Systems, 2018 IEEE international conference on acoustics, speech and signal processing. Canada . ,Apr. 2018.

Shen Guohao et al., Structure optimization design for capacitive silicon-based MEMS microphone, Semiconductor Devices, vol. 43, No. 12, p. 912-917, China Academic Journal Electronic Publishing House. ,Dec. 3, 2018.

Hua Qing et al., Acoustoeletric model of piezoelectric microphone with package structure, Transducer and Microsystem Technologies, 2018 Vol. 37, No. 11, p. 42-44, China Academic Journal Electronic Publishing House. ,Nov. 30, 2018.

Chen Guidong et al., Highly sensitive MEMS humidity sensor based on candle-soot nanoparticle layer , Micronanoelectronic Technology, vol. 57, No. 1, p. 36-40, p. 48, China Academic Journal Electronic Publishing House ,Jan. 2020.

* cited by examiner

WEARABLE SOUND DEVICE

CROSS-REFERENCE TO RELATED APPLICATIONS

This application is a continuation-in-part of U.S. application Ser. No. 17/842,810, filed on Jun. 17, 2022, which is a continuation-in-part of U.S. application Ser. No. 17/344,980, filed on Jun. 11, 2021, which claims the benefit of U.S. Provisional Application No. 63/050,763, filed on Jul. 11, 2020, and claims the benefit of U.S. Provisional Application No. 63/051,885, filed on Jul. 14, 2020, and claims the benefit of U.S. Provisional Application No. 63/171,919, filed on Apr. 7, 2021. Besides, U.S. application Ser. No. 17/842,810 claims the benefit of U.S. Provisional Application No. 63/320,703, filed on Mar. 17, 2022. Further, this application claims the benefit of U.S. Provisional Application No. 63/342,161, filed on May 16, 2022. Further, this application claims the benefit of U.S. Provisional Application No. 63/446,798, filed on Feb. 17, 2023. The contents of these applications are incorporated herein by reference.

BACKGROUND OF THE INVENTION

1. Field of the Invention

The present application relates to a wearable sound device, and more particularly, to a wearable sound device capable of improving user experience.

2. Description of the Prior Art

Noise can disrupt sleep and affect health. While it may be difficult to eliminate sources of noise such as snoring or birds chirping, sleep ear plugs can help mask noises and improve sleep quality. However, using ear plugs may result in missing important sounds such as a baby crying, a fire alarm or a phone call.

SUMMARY OF THE INVENTION

It is therefore a primary objective of the present application to provide a wearable sound device, to improve user experience.

An embodiment of the present application discloses a wearable sound device, comprising a venting device comprising a film structure and an actuator disposed on the film structure; and a driving circuit configured to be controlled by a controller and to drive the actuator, such that the film structure is controlled to form a vent or to seal the vent; wherein the controller is coupled to a sensing device configured to generate a sensing result; wherein the film structure partitions a space within the wearable sound device into a first volume and a second volume; wherein the first volume is connected to or to be connected to an ear canal of a wearable sound device user; wherein the second volume is connected to or to be connected to an ambient of the wearable sound device; wherein the first volume and the second volume are connected via the vent when the vent is formed; wherein the controller determines whether to seal the vent according to the sensing result.

An embodiment of the present application discloses a wearable sound device, comprising a venting device comprising a film structure and an actuator disposed on the film structure; and a driving circuit configured to be controlled by a controller and to drive the actuator, such that the film structure is controlled to form a vent or to seal the vent; wherein the film structure partitions a space within the wearable sound device into a first volume and a second volume; wherein the first volume is connected to or to be connected to an ear canal of a wearable sound device user; wherein the second volume is connected to or to be connected to an ambient of the wearable sound device; wherein the first volume and the second volume are connected via the vent when the vent is formed; wherein the controller receives an indication signal and determines whether to open the vent according to the indication signal.

An embodiment of the present application discloses a wearable sound device, comprising a venting device, configured to be controlled by a controller to form a vent or to seal the vent; wherein the controller is coupled to a sensing device, and the sensing device is configured to generate a sensing result; wherein a space within the wearable sound device is partitioned into a first volume and a second volume; wherein the first volume is connected to or to be connected to an ear canal of a wearable sound device user; wherein the second volume is connected to or to be connected to an ambient of the wearable sound device; wherein the first volume and the second volume are connected via the vent when the vent is formed; wherein the controller determines whether to seal the vent according to the sensing result.

An embodiment of the present application discloses a wearable sound device, comprising a venting device, configured to be controlled by a controller to form a vent or to seal the vent; wherein a space within the wearable sound device is partitioned into a first volume and a second volume; wherein the first volume is connected to or to be connected to an ear canal of a wearable sound device user; wherein the second volume is connected to or to be connected to an ambient of the wearable sound device; wherein the first volume and the second volume are connected via the vent when the vent is formed; wherein the controller receives an indication signal and determines whether to open the vent according to the indication signal.

These and other objectives of the present invention will no doubt become obvious to those of ordinary skill in the art after reading the following detailed description of the preferred embodiment that is illustrated in the various figures and drawings.

DETAILED DESCRIPTION

The use of ordinal terms such as “first” and “second” does not by itself imply any priority, precedence, or order of one element over another, the chronological sequence in which acts of a method are performed, or the necessity for all the elements to be exist at the same time, but these terms are simply used as labels to distinguish one element having a certain name from another element having the same name. The technical features described in the following embodiments may be mixed or combined in various ways as long as there are no conflicts between them.

Figure 1:
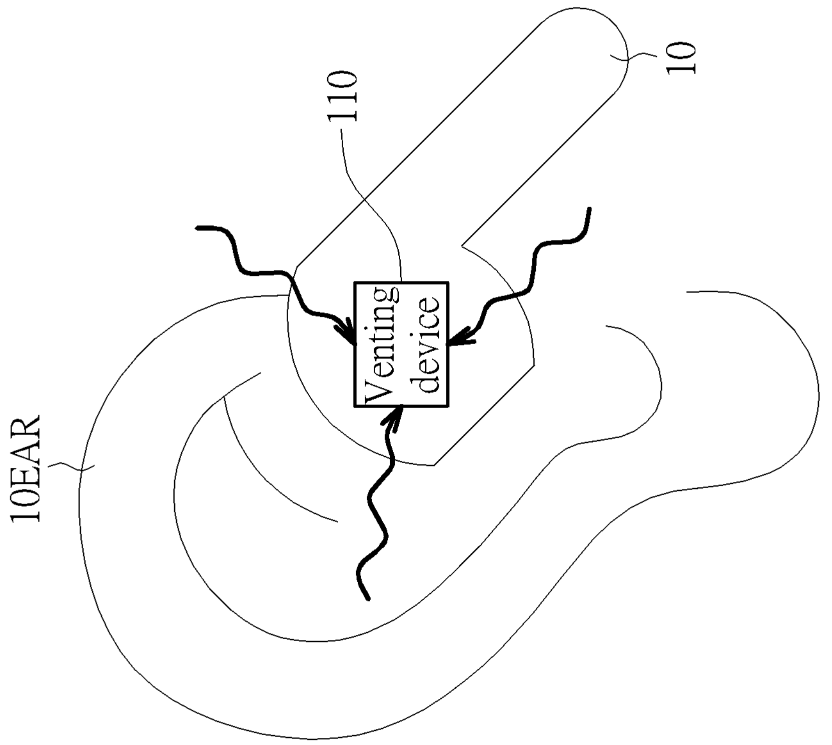
FIG. 1 to FIG. 3 are schematic diagrams of wearable sound devices according to embodiments of the present application.

FIG. 1 is a schematic diagram of a perspective view of a wearable sound device 10 located in an ear 10EAR according to an embodiment of the present application. The wearable sound device 10 (e.g., an in-ear device) may serve as a sleep ear plug. The wearable sound device 10 includes a venting device 110.

The venting device 110 is configured to form a vent or to seal the vent, such that the wearable sound device 10 can be switched between a close state to reduce sound wave propagation (or increase sound attenuation) and an open state to allow sound wave propagation (or decrease sound attenuation). The space within the wearable sound device 10 may be partitioned into a first volume and a second volume. The first volume generally represents a volume within the wearable sound device 10 which is connected to or to be connected to an ear canal of the ear 10EAR; the second volume generally represents a volume within the wearable sound device 10 which is connected to or to be connected to an ambient environment of the wearable sound device 10. The first volume and the second volume are partitioned by internal component(s) within the wearable sound device 10. When the vent is closed/sealed, the first volume and the second volume are barely connected. When the vent is formed within the venting device 110, the two volumes are connected via the vent to permit sound/air to vent from one side to another.

Generally, background sounds may refer to any audio outside the wearable sound device 10, including sounds that may not typically be considered as noise, such as alarms, speech, music, or calls directed at the wearable sound device 10. To improve sleep quality in noisy environments, the vent of the wearable sound device 10 is sealed. However, for safety reasons, the vent of the wearable sound device 10 may be formed to alert a user of the wearable sound device 10 when there is an alarm or sudden appearance of light.

In another aspect, the vent of the wearable sound device 10 may create an airflow channel between the ear canal of the ear 10EAR and the external ambient environment to release pressure caused by the occlusion effect and reduce the occlusion effect when temporarily opened. However, in terms of frequency response, there is a significant drop in sound pressure level (SPL) at lower frequencies due to the airflow channel. Therefore, the vent may be sealed when the wearable sound device 10 is playing music for the wearable sound device user.

In other words, the wearable sound device 10 is an earbud with a dynamic vent. The dynamic vent is able to create an airflow channel between the earbud front chamber/volume connecting to the ear canal of the ear 10EAR and the outside environment. In an embodiment, whether the vent of the wearable sound device 10 is open or closed to decrease or increase sound attenuation may depend on ambient conditions, such as the signal type and the signal strength of (optical/audio/smoke/motion) ambient signals. The signal type of (optical/audio/smoke/motion) ambient signals may be classified into two or more hazard classes to describe levels of risks.

Figure 2:
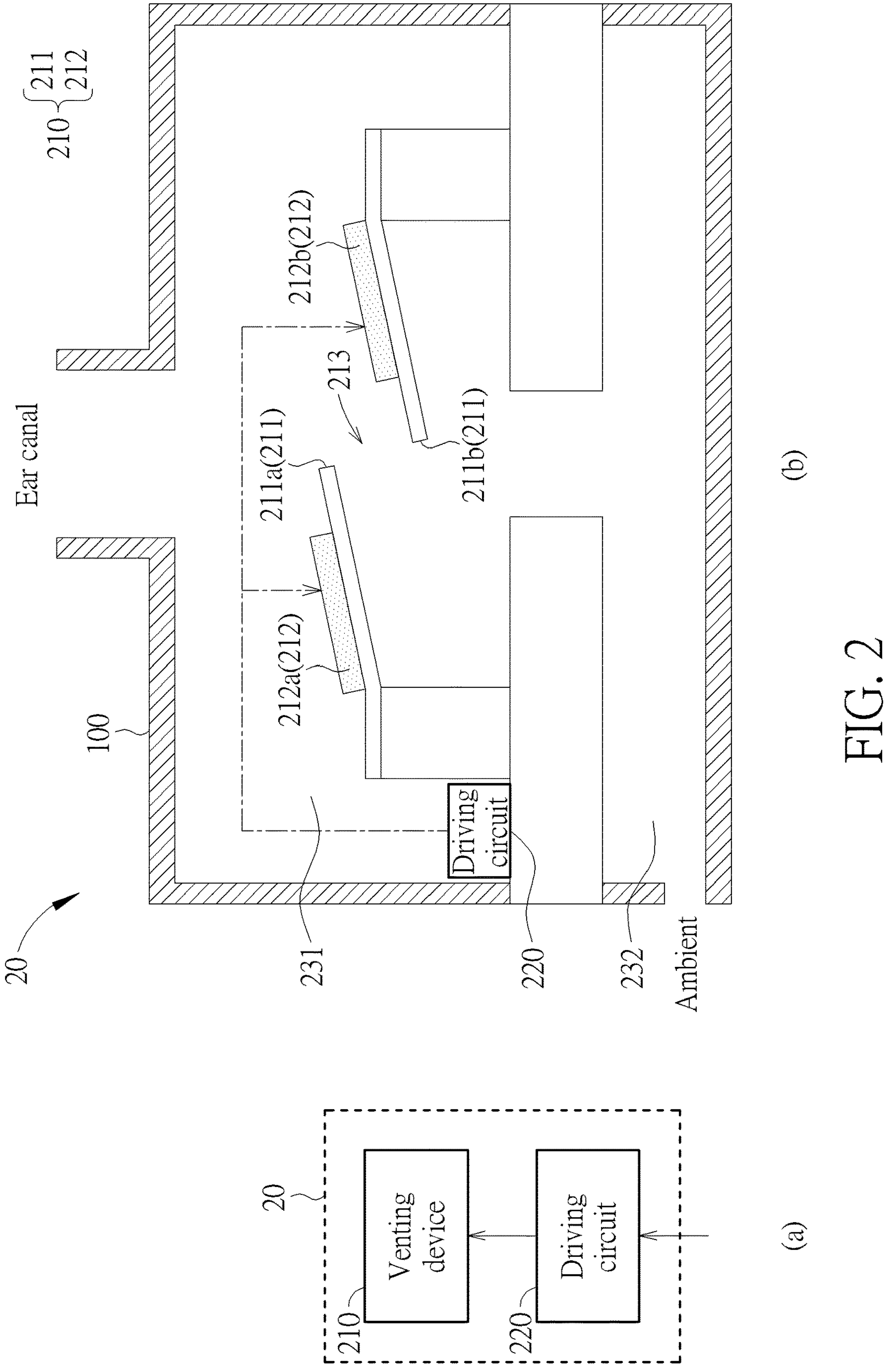

Any mechanism that can create or obstruct a vent can be utilized as the venting device 110 of the present invention. For example, FIG. 2 is a schematic diagram of a wearable sound device 20 according to an embodiment of the present application. In FIG. 2, (a) illustrates a venting device 210 and a driving circuit 220 of the wearable sound device 20, and (b) conceptually illustrates a cross sectional view of the wearable sound device 20. The venting device 110 may be implemented by the venting device 210.

The venting device 210 may include a film structure 211 and an actuator 212 disposed on the film structure 211. A slit may divide the film structure 211 into two flaps 211*a* and 211*b* opposite to each other. The flap 211*a*/211*b* may include an anchored end and a free end, such that the flap 211*a*/211*b* may be actuated by the actuator 212 to swing upwardly or downwardly. The movement of the free end of the flap 211*a* may be different from the movement of the free end of the flap 211*b*; the flaps 211*a* and 211*b* may move in the same direction (e.g., clockwise or counter-clockwise) to form a vent 213. In another embodiment, a vent may be formed as the flap 211*a*/211*b* swings in two opposite directions (e.g., clockwise and counter-clockwise).

The close state and the open state may be defined as follows: When the difference between the displacement of the free end of the flap 211*a* and the displacement of the free end of the flap 211*b* is greater than the thickness of the film structure 211, the vent 213 is said to be opened or formed. Conversely, when the difference between the displacement of the free end of the flap 211*a* and the displacement of the free end of the flap 211*b* is at least less than the thickness of the film structure 211 or when the free end of the flap 211*a* substantially overlaps or makes physical contact with the free end of the flap 211*b*, the vent 213 is said to be closed or sealed.

As shown in (b) of FIG. 2, the film structure 211 partitions the space within the housing 100 of the wearable sound device 20 into the volumes 231 and 232. The (first) volume 231 is connected to or to be connected to an ear canal of a wearable sound device user; the (second) volume 232 is connected to or to be connected to the ambient environment of the wearable sound device 20. When the actuator 212 is activated to temporarily open the vent 213 between the free end of the flap 211*a* and the free end of the flap 211*b*, the volumes 231 and 232 are connected via the vent 213, which connects the ambient environment of the wearable sound device 20 to the ear canal of the wearable sound device user. This can result in sound leakage. When the vent 213 is blocked, the volumes 231 and 232 are substantially disconnected, such that the ambient environment of the wearable sound device and the ear canal of the wearable sound device user are substantially separated or isolated from each other. There will be little to no air movement through or into the wearable sound device 20. The film structure 211 then serves as physical barriers to block surrounding noises.

The driving circuit 220 coupled to the venting device 210 is configured to drive the actuator 212 of the venting device 210, such that the film structure 211 is controlled to form the vent 213 or to seal the vent 213. For example, the driving circuit 220 may apply different voltages (or the same voltage, such as a first voltage level) to actuating portions 212*a* and 212*b* of the actuator 212 to open the vent 213 and apply the same voltage (e.g., a second voltage level) to the actuating portions 212*a* and 212*b* to close the vent 213. However, the present invention is not limited thereto. By applying voltage(s) to the venting device 210 with the use of the driving circuit 220, the wearable sound device 20 can be switched between a closed state, which reduces background noises, and an open state, which allows sound passing therethrough.

Figure 3:
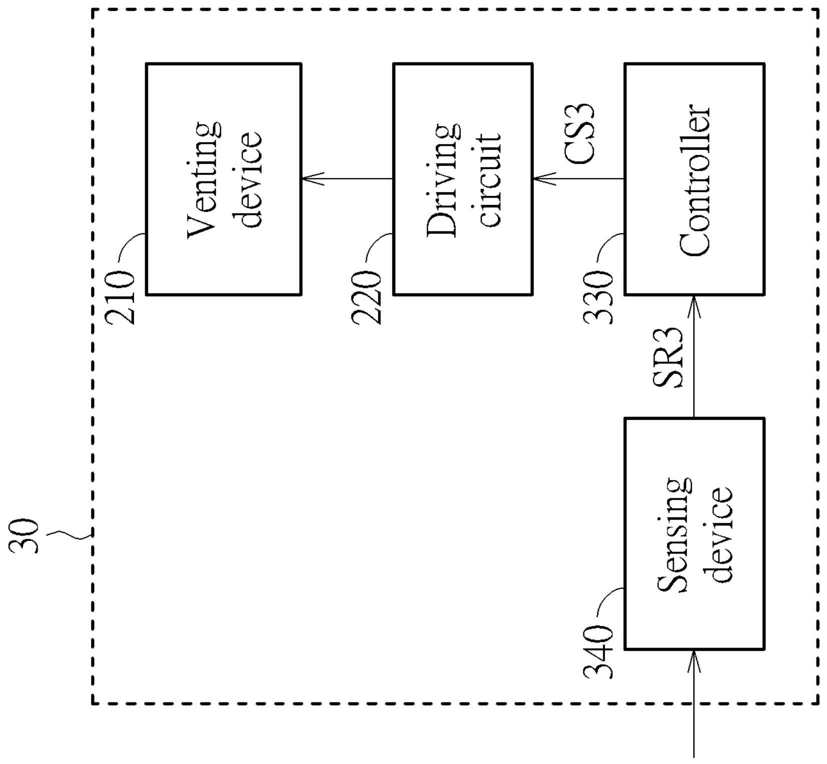

FIG. 3 is a schematic diagram of a wearable sound device 30 according to an embodiment of the present application.

Compared to the wearable sound device 10, the wearable sound device 30 further includes a controller 330 and a sensing device 340.

The sensing device 340 is configured to detect/monitor environmental conditions, including those that may indicate potential risks or activity scenarios. The sensing device 340 may be an environmental sensing device, such as a sound sensing device (or a sound acquisition device), a light sensing device, a smoke sensing device, a motion sensing device, an earthquake sensing device, a health status sensing device, other sensors, or a combination thereof. A sound acquisition device may be a microphone or a device which captures sounds from the surrounding environment and converts it into digital format signals for further processing. The sensing device 340 may generate a sensing result SR3 according to its environmental monitoring.

The controller 330 coupled to the sensing device 340 is configured to determine whether to seal/open the vent (e.g., 213) according to the sensing result SR3. The controller 330 may then control the driving circuit (e.g., 220) coupled to the controller 330 using a control signal CS3 in response to its judgments. In an embodiment, a (package) size of the control signal CS3 may be small as the control signal CS3 merely instructs to open/seal the vent.

When the controller 330 determines to open the vent (e.g., 213) according to the sensing result SR3, the controller 330 instructs the driving circuit 220 to drive the actuator (e.g., 212) of the venting device 110 in a way that opens the vent. For example, a flap (e.g., 211*a*) may be actuated to have a displacement, and another flap (e.g., 211*b*) may be actuated to have a displacement. The difference between the two displacements is larger than the thickness of the film structure (e.g., 211). Alternatively, a flap (e.g., 211*a*) may move toward a direction and another flap (e.g., 211*b*) may move toward an opposite direction.

In an embodiment, the controller 330 may generate the control signal CS3 based on the ambient background state to dynamically control the vent during sleep. In some embodiments, the sensed quantity indicated by the sensing result SR3 represents the level of ambient noise, and the degree to which the vent is opened is related to the sensed quantity. For instance, the degree of opening of the vent decreases as the ambient noise is louder. The vent may be closed in noisy background and opened in non-noisy background. The vent may also support a semi-close state if the level of background disturbance is moderate. In this way, the vent of the wearable sound device 30 may filter out loud and non-music sounds to improve sleep quality.

Figure 4:
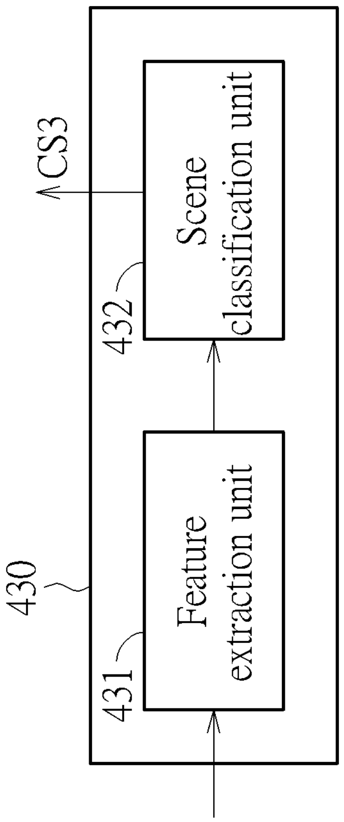
FIG. 4 and FIG. 5 are schematic diagrams of controllers according to according to embodiments of the present application.

FIG. 4 is a schematic diagram of a controller 430 according to an embodiment of the present application. The controller 330 may be implemented by the controller 430. The controller 430 may include a feature extraction unit 431 configured to perform a feature extraction operation and a scene classification unit 432 configured to perform a scene classification operation. The feature extraction unit 431 and the scene classification unit 432 may be implemented using combinations of software, firmware, and/or hardware. For example, the feature extraction unit 431 and the scene classification unit 432 may be implemented via controlling circuit(s), processing circuit(s) (e.g., DSP, digital signal processor(s)) or ASIC (Application Specific Integrated Circuit(s)), but not limited thereto.

The feature extraction unit 431 may extract feature(s) from a sensing result (e.g., SR3) received by the feature extraction unit 431. For example, the sensing result may be related to audio sounds such as snoring, fire alarms, music, or other ambient sounds. Correspondingly, the feature extraction unit 431 may map the sensing result in digital format into a kind of feature which is easier for auditory based analysis to perform digital auditory-based feature extraction. Alternative, the feature extraction unit 431 may detect specific keywords (e.g., "help" or the user's name) or sound patterns (e.g., ambulance siren or fire alarms) from the sensing result. The feature extraction operation may include Fast Fourier transform or Mel-frequency cepstral coefficients. Alternative, the feature extraction unit 431 may extract the intensity and spectral bandwidth of the sensing result to perform digital feature extraction.

The scene classification unit 432 may characterize the feature extracted by the feature extraction unit 431 and classify the feature as a certain scene. For example, in auditory scene classification operation, the scene classification unit 432 may pattern-recognize the auditory-based feature provided by the feature extraction unit 431 to classify the ambient space (e.g., bedroom) as noisy background or non-noisy background. The noisy background may include auditory object(s) of air/vehicle traffic or snoring. Alternative, in scene classification operation, the scene classification unit 432 may analyze the feature provided by the feature extraction unit 431 (e.g., the spectral properties of the optical radiation in the sensing result) to detect/identify the presence of fire or smoke and classify the ambient space as a danger zone, a hazardous zone, or a safe zone. Based on the classification, the scene classification unit 432 may produce a control signal (e.g., CS3) to the driving circuit (e.g., 220) or the venting device (e.g., 110). Consequently, the controller 430 is able to determine whether to seal/open a vent and then output the control signal in order to regulate the vent.

Figure 5:
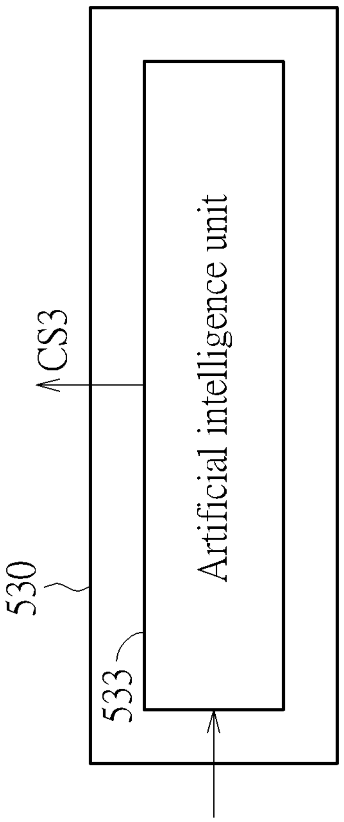

FIG. 5 is a schematic diagram of a controller 530 according to an embodiment of the present application. The controller 330 may be implemented by the controller 530. The controller 530 may include an artificial intelligence (AI) unit 533 configured to perform a feature extraction operation and a scene classification operation. Similar to the units 431 and 432, the AI unit 533 may be implemented using a combination of software, firmware, and/or hardware (e.g., via controlling/processing circuit(s) or ASIC).

When a sensing result (e.g., SR3), which is to be interpreted/recognized, is input through the trained AI unit 533 of the controller 530, the trained AI unit 533 may perform inference on the sensing result according to its optimized parameters, to generate/output a control signal (e.g., CS3) to the driving circuit (e.g., 220) or the venting device (e.g., 110). That is, the controller 530 applies/uses knowledge from the AI unit 533 to infer a prediction. The AI algorithm of the AI unit 533 may involve supervised learning, unsupervised learning, or reinforcement learning. The AI algorithm of the AI unit 533 may include neural network layers such as Convolutional Neural Network, Recurrent Neural Network, or Long Short-Term Memory network. Consequently, the controller 530 is able to determine whether to seal/open a vent and then output the control signal in order to regulate the vent.

Figure 6:
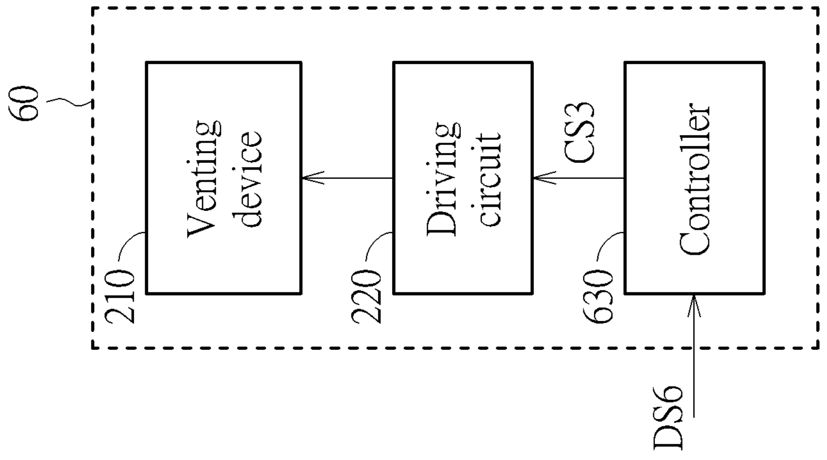
FIG. 6 and FIG. 7 are schematic diagrams of wearable sound devices according to embodiments of the present application.

FIG. 6 is a schematic diagram of a wearable sound device 60 according to an embodiment of the present application. Compared to the wearable sound device 10, the wearable sound device 60 further includes a controller 630.

The controller 630 is configured to receive an indication signal DS6 and determine whether to open/seal the vent according to the indication signal DS6. The controller 330 may then control the driving circuit (e.g., 220) using the control signal CS3 in response to its judgments. The indication signal DS6 may be an alarm signal such as an alarm clock signal or a home alarm indication. The indication signal DS6 may be transmitted by an internet-of-things (IOT) device such as a smart phone or an earthquake early warning system. The controller 630 and the IOT device may be assigned Internet Protocol (IP) addresses and are able to transfer data over a network.

Figure 7:
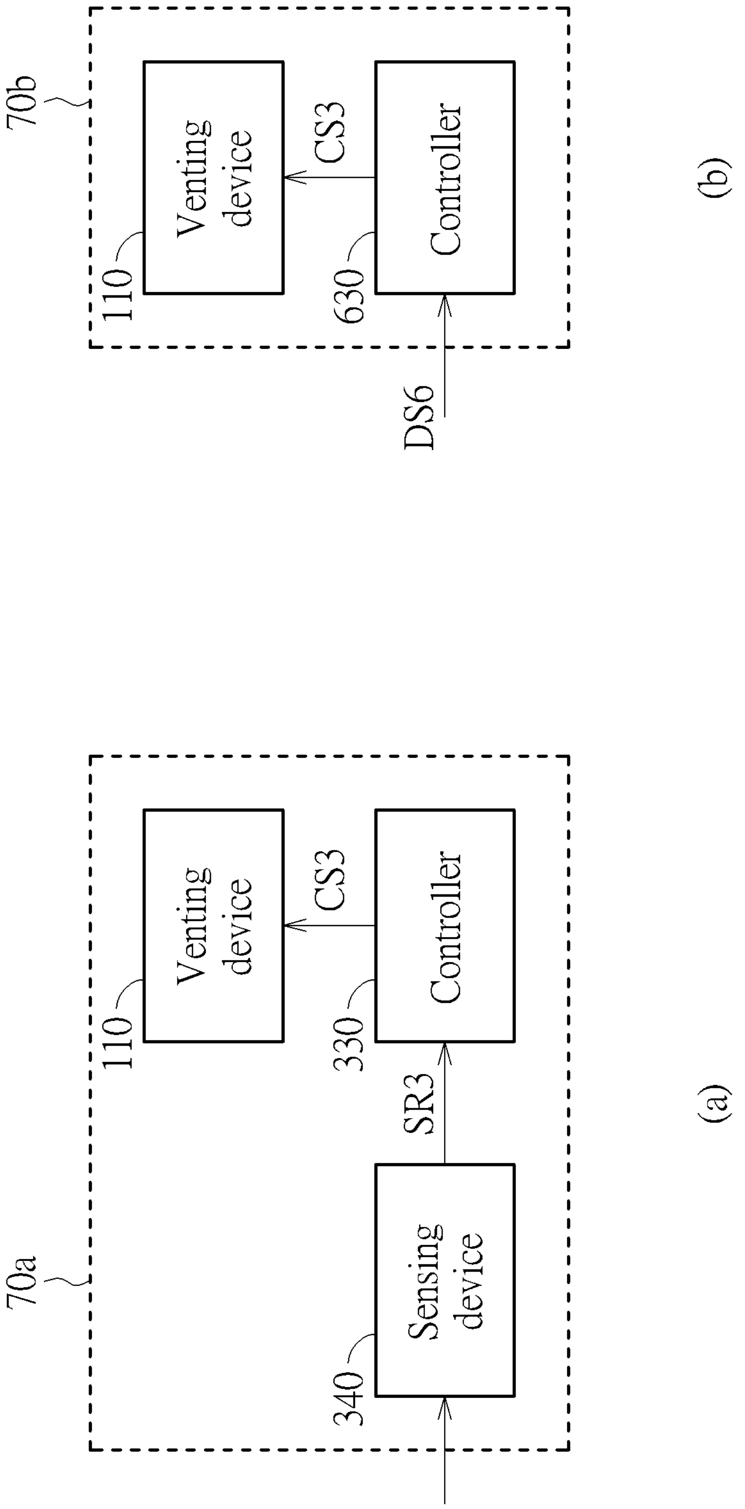

In FIG. 3 or 6, the wearable sound device 30 or 60 includes the driving circuit 220 and the venting device 210 including the film structure 211; however, the present invention is not limited thereto. For example, FIG. 7 is a schematic diagram of wearable sound devices 70*a* and 70*b* according to embodiments of the present application. In FIG. 7, (a) and (b) illustrate the wearable sound devices 70*a* and 70*b* respectively. The controller 330/630 is configured to determine whether to seal/open a vent, and the venting device 110 of the wearable sound device 70*a* or 70*b* is controlled by the controller 330 or 630 using the control signal CS3 to form the vent or to seal the vent. The venting device 110 of the present application (or of the wearable sound device 70*a* or 70*b*) may generally refer to device which is capable of being controlled to form a vent (to make the first and second volumes connected) or seal the vent, which is not limited to the venting device 210 including the film structure 211. The venting device 110 of the wearable sound device 70*a* or 70*b* may include a component that can move linearly or nonlinearly in response to the voltage level of the control signal CS3. For example, the venting device 110 of the present application (or of the wearable sound device 70*a* or 70*b*) may include only one flap that can swing in response to the voltage level of the control signal CS3. The driving circuit 220 may be absent from the wearable sound device 70*a* or 70*b*.

In FIG. 3, 6, or 7, the wearable sound device 30, 60, 70*a*, or 70*b* includes the controller 330, 630, or the sensing device 340; however, the present invention is not limited thereto. For example, FIG. 8 is a schematic diagram of systems 80Sa to 80Sd according to embodiments of the present application.

Figure 8:
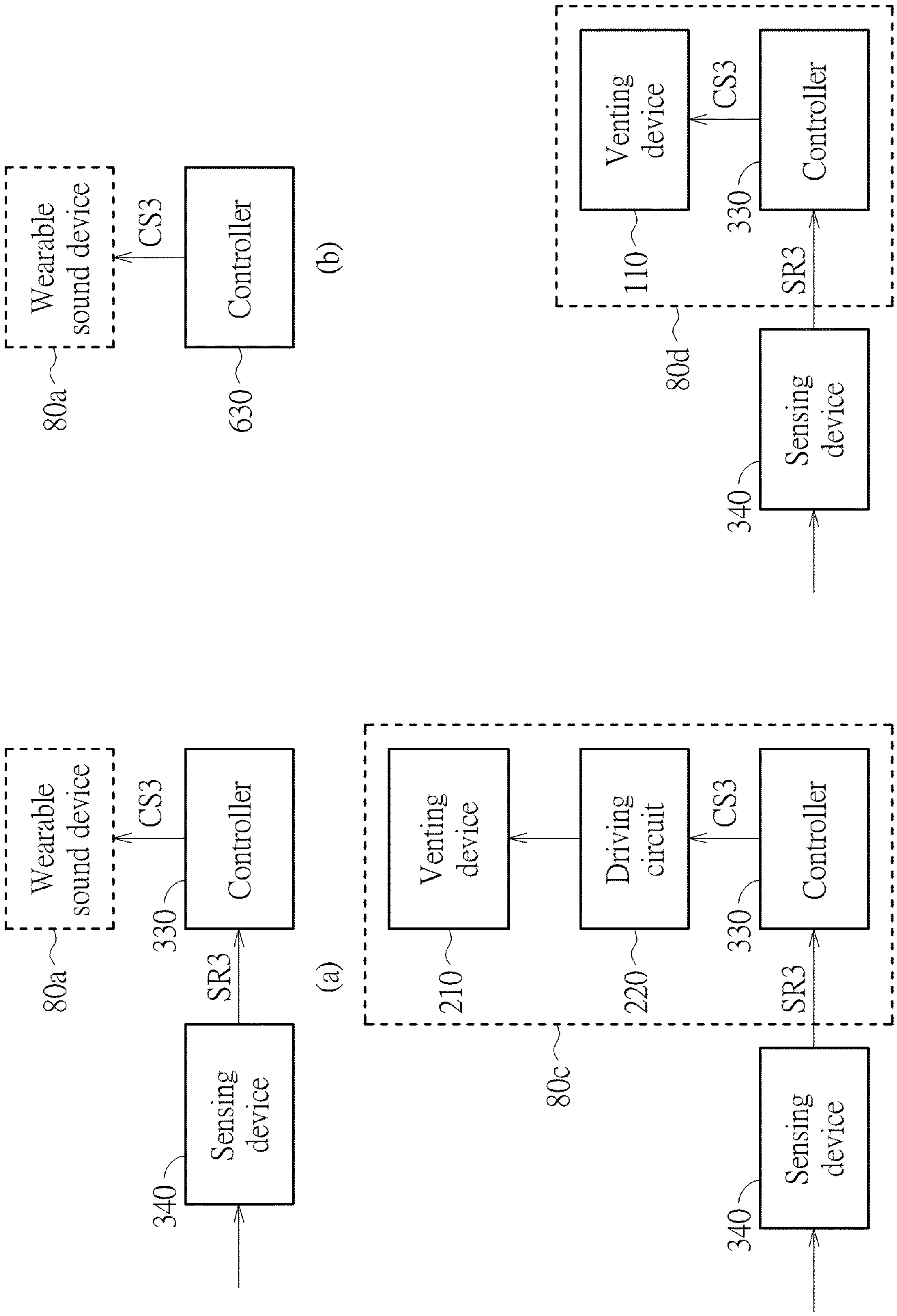
FIG. 8 is a schematic diagram of systems according to embodiments of the present application.

In FIG. 8, (a) illustrates the system 80Sa, which includes a wearable sound device 80*a*, the controller 330, and the sensing device 340. The wearable sound device 80*a* may be implemented by the wearable sound device 10 or 20. The venting device 110 or the driving circuit 220 of the wearable sound device 80*a* is connected to the controller 330 outside the wearable sound device 80*a* via a wireless/wired connection. The wireless connection may be short range connection such as IEEE 802.15.4 (ZigBee) or Bluetooth/BLE, medium range connection such as Wi-Fi, or even long range connection such as LTE or 5G. The controller 330 and the sensing device 340 may be disposed in electronic device(s) such as a smart phone, a tablet or other devices which meet most fast computing needs and have massive battery capacities. Leveraging the computing resource of the electronic device(s) may reduce the complexity, power consumption, or extend battery life of the wearable sound device 80*a* by offloading all (computation) processing to the electronic device(s). Besides, microphone(s) or other sensor(s) of the electronic device(s) may be used as the sensing device 340 of the wearable sound device 80*a*.

In FIG. 8, (b) illustrates the system 80Sb, which includes the wearable sound device 80*a* and the controller 630. The venting device 110 or the driving circuit 220 of the wearable sound device 80*a* is connected to the controller 630 disposed in an electronic device outside the wearable sound device 80*a* via a wireless/wired connection.

In FIG. 8, (c) illustrates the system 80Sc, which includes a wearable sound device 80*c* and the sensing device 340. The wearable sound device 80*c* may include the venting device 210, the driving circuit 220, and the controller 330, which is connected to the sensing device 340 disposed in an electronic device outside the wearable sound device 80*c* via a wireless/wired connection.

In FIG. 8, (d) illustrates the system 80Sd, which includes a wearable sound device 80*d* and the sensing device 340. The wearable sound device 80*d* may include the venting device 110 and the controller 330, which is connected to the sensing device 340 disposed in an electronic device outside the wearable sound device 80*d* via a wireless/wired connection.

Figure 9:
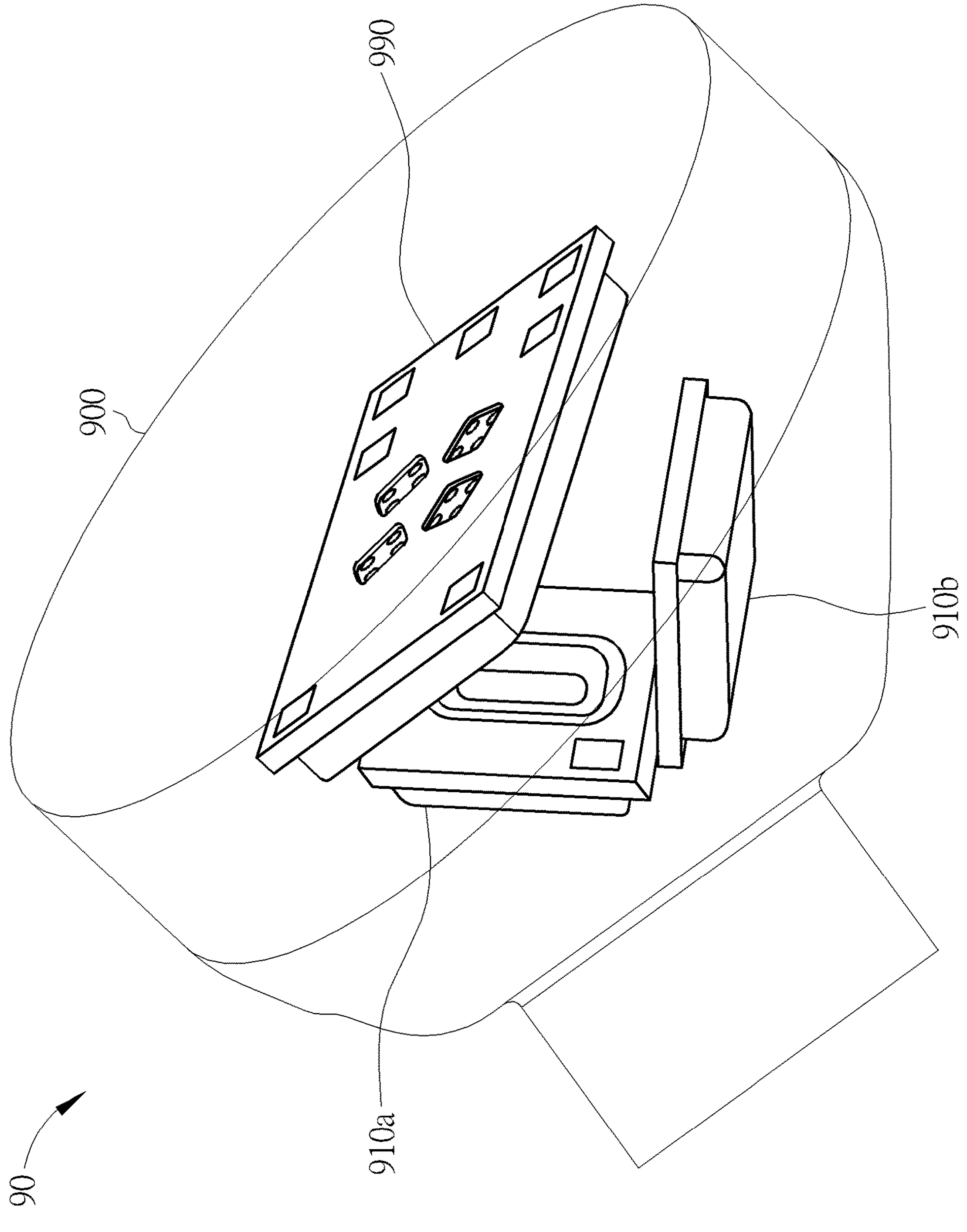
FIG. 9 is a schematic diagram of a wearable sound device according to an embodiment of the present application.

FIG. 9 is a schematic diagram of a wearable sound device 90 according to an embodiment of the present application. The wearable sound device 90 may include venting devices 910*a*, 910*b* and a sound producing device 990, all of which may be disposed within a housing 900. The venting devices 910*a* and 910*b* and the sound producing device 990 may be coupled to a processing circuit. In the embodiment shown in FIG. 9, the venting devices 910*a*, 910*b* may be disposed symmetrically, but not limited thereto. The venting device 910*a/b* may comprise the film structure 211 shown in FIG. 2 and a lid (covering structure) covering the film structure 211, but not limited thereto. The sound producing device 990 configured to produce sounds may be any type of electroacoustic transducer (e.g., a speaker) used to play audio, such as music or other audio content, in response to an electrical input signal.

Details or modifications of a wearable sound device, a sound producing device, a venting device, a driving circuit, or an (active noise canceling) audio apparatus are disclosed in U.S. application Ser. No. 16/920,384, Ser. No. 17/008,580, Ser. No. 17/842,810, Ser. No. 17/344,980 Ser. No. 17/344,983, and Ser. No. 17/720,333, the disclosure of which is hereby incorporated by reference herein in its entirety and made a part of this specification.

In an embodiment, the venting device (e.g., 110) may be a Micro Electro Mechanical System (MEMS) device. In an embodiment, the actuator (e.g., 212) may include a piezoelectric actuator or a nanoscopic-electrostatic-drive (NED) actuator.

In an embodiment, the sensing device may be or comprise an accelerometer, a pressure senor, an altitude sensor, or a proximity sensor. The controller (which may incorporate DSP) may determine whether to seal/open the vent according to the sensing result produced by the sensing device.

To sum up, closing the vent on the wearable sound device of the present invention can prevent background noise from entering the ear canal, thereby improving sleep satisfaction. However, when there is less disturbance in the surrounding environment, the vent can be opened to release ear canal pressure and allow for better environmental awareness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wearable sound device, comprising:

a venting device comprising a film structure and an actuator disposed on the film structure; and a driving circuit configured to be controlled by a controller and to drive the actuator;

wherein the film structure is configured to be controlled to form a vent when the controller determines to form the vent and configured to be controlled to seal the vent when the controller determines to seal the vent;

wherein the controller is coupled to a sensing device configured to generate a sensing result;

wherein the film structure partitions a space within the wearable sound device into a first volume and a second volume;

wherein the first volume is connected to or to be connected to an ear canal of a wearable sound device user;

wherein the second volume is connected to or to be connected to an ambient of the wearable sound device;

wherein the first volume and the second volume are connected via the vent when the vent is formed;

wherein the controller determines whether to seal the vent and whether to form the vent via the film structure according to the sensing result.

2. The wearable sound device of claim 1, wherein the wearable sound device comprises the controller, and the controller is coupled to the driving circuit.

3. The wearable sound device of claim 1, wherein the driving circuit is connected to the controller via a wireless connection.

4. The wearable sound device of claim 1, wherein the wearable sound device comprises the sensing device.

5. The wearable sound device of claim 1, wherein the controller is connected to the sensing device via a wireless connection.

6. The wearable sound device of claim 1, wherein the sensing device is an environmental sensing device.

7. The wearable sound device of claim 1, wherein the sensing device is a light sensing device.

8. The wearable sound device of claim 1, wherein the sensing device is a sound sensing device.

9. The wearable sound device of claim 1, wherein the controller is coupled to the sound sensing device, performs an auditory-based feature extraction operation and an auditory scene classification operation, and produces a control signal to the driving circuit accordingly.

10. The wearable sound device of claim 1, wherein the controller receives an indication signal, and determines whether to open the vent according to the indication signal.

11. The wearable sound device of claim 10, wherein the indication signal is an alarm signal.

12. The wearable sound device of claim 10, wherein the indication signal is transmitted by an TOT (internet of thing) device.

13. The wearable sound device of claim 1, wherein the wearable sound device comprises a sound producing device configured to produce sound.

14. The wearable sound device of claim 1, wherein the film structure comprises a first flap and a second flap;

wherein when the controller determines to open the vent, the first flap moves toward a first direction and the second flap moves toward a second direction opposite to the first direction.

15. The wearable sound device of claim 1, wherein the film structure comprises a first flap and a second flap;

wherein when the controller determines to open the vent, the first flap is actuated to have a first displacement and the second flap is actuated to have a second displacement;

wherein a difference between the first displacement and the second displacement is larger than a thickness of the film structure.

16. The wearable sound device of claim 1, wherein the sensing device comprises an accelerometer, a pressure senor, an altitude sensor, or a proximity sensor.

17. A wearable sound device, comprising:

a venting device comprising a film structure and an actuator disposed on the film structure; and a driving circuit configured to be controlled by a controller and to drive the actuator;

wherein the film structure is configured to be controlled to form a vent when the controller determines to form the vent and configured to be controlled to seal the vent when the controller determines to seal the vent;

wherein the film structure partitions a space within the wearable sound device into a first volume and a second volume;

wherein the first volume is connected to or to be connected to an ear canal of a wearable sound device user;

wherein the second volume is connected to or to be connected to an ambient of the wearable sound device;

wherein the first volume and the second volume are connected via the vent when the vent is formed;

wherein the controller receives an indication signal;

wherein the controller determines whether to open the vent according to the indication signal.

18. The wearable sound device of claim 17, wherein the indication signal is an alarm signal.

19. The wearable sound device of claim 17, wherein the indication signal is transmitted by an TOT (internet of thing) device via a wireless connection.

20. The wearable sound device of claim 17, wherein the film structure comprises a first flap and a second flap;

wherein when the controller determines to open the vent, the first flap moves toward a first direction and the second flap moves toward a second direction opposite to the first direction.

21. The wearable sound device of claim 17, wherein the film structure comprises a first flap and a second flap;

wherein when the controller determines to open the vent, the first flap is actuated to have a first displacement and the second flap is actuated to have a second displacement;

wherein a difference between the first displacement and the second displacement is larger than a thickness of the film structure.

* * * * *